United States Patent [19]

Tsou

[11] 4,089,844

[45] May 16, 1978

[54] BLOCKED POLYISOCYANATE AND METHOD

[75] Inventor: Ivan H. Tsou, Bloomfield Hills, Mich.

[73] Assignee: Grow Chemical Corp., New York, N.Y.

[21] Appl. No.: 601,505

[22] Filed: Aug. 4, 1975

Related U.S. Application Data

[63] Continuation-in-part of Ser. No. 481,884, Jun. 21, 1974, abandoned, and a continuation-in-part of Ser. No. 496,066, Aug. 9, 1974, abandoned.

[51] Int. Cl.² .................... C08G 18/62; C08G 18/80; C08L 75/04
[52] U.S. Cl. .................. 260/77.5 CR; 260/30.4 N; 260/31.2 N; 260/32.6 N; 260/33.4 UR; 260/77.5 TB; 260/858; 260/859 R; 260/13
[58] Field of Search ........ 260/77.5 TB, 859, 77.5 CR

[56] References Cited

U.S. PATENT DOCUMENTS

| Re. 27,151 | 6/1971 | Hicks | 260/47 UA |
|---|---|---|---|
| 3,401,135 | 9/1968 | Sato | 260/29.6 |
| 3,659,003 | 4/1972 | Johnson et al. | 260/859 |
| 3,660,355 | 5/1972 | Johnson | 260/77.5 CR |
| 3,660,359 | 5/1972 | Labana | 260/77.5 TB |
| 3,676,405 | 7/1972 | Labana | 260/77.5 TB |
| 3,719,522 | 3/1973 | Johnson et al. | 260/77.5 TB |
| 3,775,427 | 11/1973 | Habermeier | 260/309.5 |
| 3,819,586 | 6/1974 | Rudolph et al. | 260/77.5 TB |
| 3,822,240 | 7/1974 | Schmitt et al. | 260/77.5 TB |
| 3,830,785 | 8/1974 | Matsui et al. | 260/77.5 TB |
| 3,857,818 | 11/1974 | Frizelle | 260/77.5 TB |
| 3,867,347 | 2/1975 | Felber | 260/309.5 |
| 3,893,978 | 7/1975 | deCleur et al. | 260/77.5 TB |
| 3,931,117 | 1/1976 | Leonard | 260/77.5 TB |
| 3,933,759 | 1/1976 | Hoeschele | 260/77.5 TB |
| 3,947,426 | 3/1976 | Lander | 260/77.5 TB |
| 3,954,719 | 5/1976 | Pirck et al. | 260/77.5 TB |

*Primary Examiner*—H.S. Cockeram
*Attorney, Agent, or Firm*—Burton, Parker & Schramm

[57] ABSTRACT

A blocked polyisocyanate is produced comprising the steps:

1. reacting a polyisocyanate with a blocking agent wherein the isocyanato groups vary in their reactivity and the reaction is continued until about 90-100% of the most reactive isocyanato group of the polyisocyanate is reacted;
2. reacting the product of Step 1 with a polyfunctional agent, which agent is an internal plasticizing agent for a polymerized resin having isocyanate reactive functionality after curing of the resin and an external plasticizing agent prior to curing of the resin;
3. determining the free isocyanate content of the product of Step 2;
4. then adding an amount of said polyfunctional agent sufficient to react with the unreacted isocyanate groups.

8 Claims, No Drawings

BLOCKED POLYISOCYANATE AND METHOD

CROSS-REFERENCE TO RELATED APPLICATION

The present case is a continuation-in-part of U.S. Ser. No. 481,884, filed June 21, 1974, now abandoned, entitled A Powdered Coating Composition and Method, and U.S. Ser. No. 496,066 filed Aug. 9, 1974, now abandoned entitled Blocked Polyisocyanate and Method, which are hereby incorporated by reference.

BACKGROUND OF THE INVENTION

The invention is concerned with a blocked polyisocyanate having a use in coating composition and in particular a powder coating composition as the cross-linking agent. In particular, the coating composition is comprised of various segments which during the curing of these segments form a flexible adherent film upon the substrate. Most preferably, the powder is comprised of a polymerized acrylic resin and a cross-linking agent having a blocked isocyanate group.

The problems to be solved for prior coating compositions, especially powder paint coating compositions are that they had poor flow during cure and the films had poor gloss. In addition, there were high temperatures required for fusing, while the cross-linking reaction temperature was even higher, about 375°–500° F. Further, blocked isocyanate materials had a tendency to cake in storage at low temperatures, such as, 70°–80° F and that the coatings were brittle, lacked flexibility and adhesion.

During the cure of the coating composition, completely blocked materials (e.g. isophorone diisocyanate blocked with oximes) have a tendency to be low boilers thereby causing boil-off especially at high temperature curing. A satisfactory coating cannot be obtained when such impurities are present in the coating composition. Also, the same materials have a tendency to cause caking during storage because of their low molecular weight.

The solution to these problems would be to have as pure a cross-linking agent as possible, which is compatible with the polymerized resin. In addition, the cross-linking agent should impart flow at a desired low curing temperature as a solvent and act as an external plasticizing agent for the resin, yet be stable below desired storage temperature; it also should have functional groups which will cross-link with the resin at as low a temperature as efficiently possible and after cross-linking will become part of film and act as an internal plasticizer.

U.S. Pat. No. 3,660,143 teaches a radiation curable paint binder having the addition product of a hydroxy functional acrylic rubber particle, a diisocyanate and a hydroxyalkyl acrylate and vinyl monomers.

U.S. Pat. No. 3,542,586 teaches a radiation curable paint with a vinyl binder having pendant monoester groups.

U.S. Pat. No. 3,317,463 teaches the utilization of blocked isocyanate compositions (blocked with hindered phenols) in preparation of urethanes, while U.S. Pat. No. 3,583,943 teaches the blocking of an isocyanate group with a ketoxime.

U.S. Pat. No. 3,621,000 teaches a blocked isocyanate with a bifunctional polyether.

U.S. Pat. No. 3,659,003 teaches a copolymerized acrylic resin which is reacted with a monoblocked diisocyanate to produce molding powders. The difficulty with all of the previous art is that there is not a simple means of incorporating a plasticizing effect into a cross-linked polymerized resin by a convenient processing step in the formation of a resin film as has been described above.

Further the difficulty with all of the previous art is that there is not a simple means of formulating a powder composition which can rapidly be cured to the desired film at a low temperature.

SUMMARY OF THE INVENTION

A blocked polyisocyanate is produced comprising the steps:

1. reacting a polyisocyanate with a blocking agent wherein the isocyanato groups vary in their reactivity and the reaction is continued until about 90–100% of the most reactive isocyanato group of the polyisocyanate is reacted;

2. reacting the product of Step 1 with a polyfunctional agent, which agent is an internal plasticizing agent for a polymerized resin having isocyanate reactive functionality after curing of the resin and an external plasticizing agent prior to curing of the resin;

3. determining the free isocyanate content of the product of Step 2;

4. then adding an amount of said polyfunctional agent sufficient to react with the unreacted isocyanate groups.

The improved blocked polyisocyanate composition produced according to the above process, is particularly useful when it is used in conjunction with a polymerized resin having isocyanate reactive functionality. A combination of these ingredients produces a desirable coating composition, and in particular, a powder coating composition. The preferred polymerized resin is an acrylic resin having pendant hydroxyl groups.

DESCRIPTION OF PREFERRED EMBODIMENTS

The distinct advantage of following the process of the present invention is the production of a more stable blocked polyisocyanate. Low boilers are produced due to the formation of the polyisocyanate wherein the isocyanato groups are completely blocked. This is an undesirable by-product for its formation prevents the isocyanato group from reacting with the polyfunctional agent.

Preferably, the first step of the process of the present invention involves the blocking of one of the isocyanato groups of the polyisocyanate reactant (e.g. a diisocyanate). This reaction step is interrupted prior to completion, i.e. about 45–50% charged of the polyisocyanate has had one isocyanato group blocked. The preferred range is about 47% to about 50% of the polyisocyanate reacted. The reaction temperature should be kept reasonably low, about 25° C or less to decrease side reactions.

The cross-linking agent that is employed as a component of the powder coating composition is a polyfunctional organic isocyanate wherein at least one isocyanate group is a blocked isocyanate group and at least one isocyanate group has been reacted with an agent that after curing of the coating composition is an internal plasticizing agent for the resin but prior to curing is an external plasticizing agent for the resin. By "internal plasticizing agent" is meant a material which is a separate chemical entity or a portion of another chemical entity which imparts a plasticizing effect to the resin, i.e., imparts flexibility, workability and ability to flow, and which after cure, the agent is chemically bonded to the polymerized resin. By "external plasticizing agent" is meant a material which is a separate chemical entity or a portion of another chemical entity which imparts a plasticizing effect to the resin, i.e., imparts flexibility, workability and ability to flow, and which is not chemically bonded to the polymerized resin. The distinct advantage of employing a blocked isocyanate is that during the curing of the powder coating composition, the isocyanate group will become unblocked and the isocyanate group may be reacted with the isocyanate reactive functional groups which are pendant from the polymerized resin.

By "blocked isocyanate" is meant an isocyanate group which has been reacted with a blocking agent which reaction product is stable at ambient temperatures and pressures and stable up about 50° C, for periods of time, and which is compatible with the polymerized resin having isocyanate reactive functionality. During the curing of the powder coating composition, the blocked isocyanate becomes unblocked during baking, such as from about 125° to about 200° C, which unblocked isocyanate groups are then reactive with the pendant isocyanate reactive functional groups in the polymerized resin.

In preparing the blocked isocyanate of the present invention, the organic polyisocyanate is one that has isocyanato groups that vary in their reactivity. The polyfunctional isocyanate materials that may be employed are alkyl (2 to 8 carbon atoms), cycloalkyl (5 to 8 carbon atoms), isocyanates such as cyclohexylene diisocyanate, isophorone diisocyanate, and the like; aromatic diisocyanates such as orthophenylene diisocyanate, toluene diisocyanate, such as the 2,4- and the 3,6-toluene diisocyanate, biphenylene diisocyanates wherein the phenyl ring may be substituted with alkyl groups, alkoxy groups, and the like, wherein the alkyl groups are up to 4 carbon atoms. Other isocyanates that may be employed are:
polymethylene phenyl polyisocyanate;
polyphenylene polyisocyanate;
Desmudure-N (trademark of Bayer for polyisocyanate materials);
Hylene W (trademark of DuPont for polyisocyanate materials, such as methylene-bis-4-phenyl isocyanate);
methylene-bis-(cyclohexyl isocyanate);
ethylene-bis-(cyclohexyl isocyanate);
propylene-bis-(cyclohexyl isocyanate);
2,5- diisocyano - 1,3,4,-oxadiazole;
(CH$_3$)$_2$ Si-(isocyanocyclohexyl).

Most preferred polyisocyanates are those having 2 or 3 isocyanate groups, most preferably 2 isocyanato groups having a substantial difference in their reactivity.

In order to impart both external and internal plasticizing effects, preferably the agent is reacted with one isocyanate group of the polyisocyanate. Suitable isocyanate reactive agents are: saturated aliphatic glycols or polyhydric alkanes or cycloalkanes, such as butylene glycol, 1,6 dihydroxy octane; 1,7-dihydroxyoctane; 1,10-dihydroxy decane; 1,12-dihydroxydodecane; 2,2,2-trimethylolpentane; pentaerythritol; 1,3,5,-trihydroxypentane; 2,4,6-trihydroxyhexane; meopentyl glycol (2,2-dimethyl-1,3-dihydroxy propane); 2,2,4-trimethyl-1,3-pentanediol; 1,4 cyclohexanedimethanol; and the like; polyoxyalkylene glycol wherein the alkylene is from 2 to 4 carbon atoms, such as, polyoxyethylene glycol, polyoxypropylene glycol, polyoxybutylene glycol, of a molecular weight of up to 500; polyhydric materials having the repeating linkage —[CH$_2$—CH(CH$_2$OH)O]—$_n$H wherein $n$ ranges from 1 to 10; polyhydric lactones such as polycaprolactone of low molecular weight (up to 3,000 weight average); polyaminocompounds, such as, 1,4-diamino butane; 1,6-diamino-hexane; 1,8-diaminododecane; it is to be appreciated that the amino compounds should be primary or secondary amines having at least one reactive hydrogen; a substitutent may be attached to the nitrogen; the substitutent may be an alkyl group or hydroxy alkyl group of from 1 to 6 carbon atoms.

Suitable examples of mercapto compounds are: 1,4-dimercapto pentane; 1,6-dimercapto hexane; 1,8-dimercapto octane; 1,10-dimercapto decane; 1,12-dimercapto dodecane.

Suitable examples of amido compounds that may be employed are 1,4-diamido butane; 1,6-diamido hexane; 1,8-diamido octane; 1,10-diamido decane; 1,12-diamido dodecane. It is to be appreciated that a hydrogen attached to the amido group may be replaced by an alkyl or hydroxy alkyl thereby having at least one replaceable hydrogen which may be reacted from the amido group.

The isocyanate group can be "blocked" wherein the isocyanate group is reacted with a material which subsequently, under the application of heat, will decompose which then may enter into a reaction with the pendant functional group of the polymerized monomer such as with a hydroxyl group to give a urethane or an amino group to give a urea or an amido to give a group of the structure

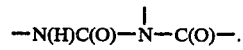

A suitable list of blocking agents are those recited in U.S. Pat. Nos. 2,982,754 or 3,499,852 which are hereby incorporated by references. Some blocking agents that may be employed are phenols, alcohols, caprolactam, aldoximes or ketoximes. Preferably, the blocking agent is a ketoxime. Suitable ketoximes are those recited in U.S. Pat. No. 3,583,943 which is hereby incorporated by reference. The preferred ketoxime are dialkyl (1 to 6 carbon atoms) ketoximes, such as the dimethyl ketoxime, methyl ethyl ketoxime, methyl isobutyl ketoxime, diisobutyl ketoxime and the like.

In the preparation of the cross-linking agent at least one of the isocyanate groups of the polyfunctional isocyanate is reacted with an isocyanate reactive compound which will induce or impart the desirable effects during the curing step and after cure. The use of a blocking agent adds to the quick curing step of the powder composition described herein.

It is to be appreciated that any plasticizing agent having a replaceable hydrogen from a functional group may be used providing the functional group is reactive with one of the isocyanate groups of the polyfunctional organic isocyanate material. It is preferred that the plasticizing agent have two functional groups and possibly three functional groups which may react with the polyisocyanate.

The plasticizing agent is a polyfunctional material which is reactive with the isocyanato group of the polyfunctional isocyanate. The preferred plasticizing agent that may be employed is one containing at least 4 carbon atoms wherein the functional groups have isocyanate reactivity and are separated by at least 1 carbon atom. Preferably, the plasticizing agent has at least 6 carbon atoms to about 20 carbon atoms, more preferably 6 to 12 carbon atoms.

Suitable polyfunctional plasticizing agents are those that may contain any one or a mixture of the following groups: hydroxyl, mercapto, amido, amino groups, and the like. It is to be appreciated that the functional groups that are present on the plasticizing agent may be mixed, that is, contain hydroxyl and amino, or hydroxyl and mercapto or both hydroxyl and the like. Preferably, the functional groups are both hydroxyl groups. For a recital of the desirable agents, see the aforementioned isocyanate reactive agents.

The plasticizing agent may itself be the reaction product of various organic reactions, such as the ester resulting from the reaction of a polyhydroxyl material and an acid, its anhydride or a dibasic acid. Suitable polyhydric materials are described above. Suitable acids, dibasic acids and their anhydrides may have up to 12 carbon atoms such as oxalic acid, malonic acid, glutaric acid, adipic acid, pimelic acid, suberic acid, azelic acid and sebacic acid. One preferred ester is that resulting from reacting neopentyl glycol and 2,2-dimethyl, 3-hydroxy proprionic acid, having the structure (1) $HO - CH_2 - C(CH_3)_2 - CH_2 - O - C(O) - C(CH_3)_2 - CH_2 - OH$ The primary properties of the plasticizing agent is that it gives the desired plasticizing effect in the cross linking agent during the curing step and after the film is cured.

Other suitable polyhydric materials which may react with a polyisocyanate are polyhydric hydantoin materials generally of the structure

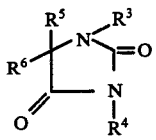
(2)

wherein R5 and R6 may be the same or different and may be hydrogen, alkyl of 1 to 6 carbon atoms, hydroxyl alkyl of 1 to 6 carbon atoms, phenyl and the like.

R3 and R4 may be the same or different and may be hydrogen, alkyl of from 1 to 6 carbon atoms, hydroxy alkyl of from 1 to 6 carbon atoms, polyoxyalkylene of from 2 to 4 carbon atoms per alkylene group with a terminal hydroxy group; repeating units of

where $n$ ranges from 1 to 10, and the like. It is to be appreciated that the hydantoin materials must contain at least two hydroxyl groups. Normally these compounds are prepared by reacting dimethyl hydantoin ($R^5$ and $R^6$ are methyl and $R^3$ and $R^4$ are hydrogen) with the appopriate hydroxy inducing material, such as, epichlorohydrin, ethylene oxide, propylene oxide, butylene oxide and the like. The reaction product of epichlorohydrin may require hydrolysis to remove the chloro groups. In general "polyhydric hydantoin" derivatives may be said to contain the basic five membered ring structure recited above (regardless of $R^{3-6}$ substituents) with at least two hydroxy groups in the molecule.

It has also been determined that a bis hydantoin derivative may also be employed, i.e., the appropriate hydroxy derivative of methylene-bis-(substituted hydantoin).

The preferred hydantoin is where $R^5$ and $R^6$ are both methyl and $R^3$ and $R^4$ are both — $C_2H_4OH$. A second preferred hydantoin is when $R^5$ and $R^6$ are both methyl and $R^3$ and $R^4$ are both — $CH_2OH$.

Because the final powder composition should have a rapid cure, the blocking agent will be released at the appropriate temperature preferably about 250° F. Since the first reacted —NCO group of the polyfunctional isocyanate reactant is the most reactive and is now unblocked (250° F), it can rapidly cross-link with the isocyanate reactive groups pendant from the polymerized resin, thereby giving a rapid cure.

A further distinct advantage of the cross-linking agent of the present invention is that it is very stable due to the blocked isocyanate, especially when exposed to the atmosphere. This is particularly important for a powder coating composition in that there is improved shelf life and the powder will not cake during handling.

The present invention is concerned with a blocked polyisocyanate which is a portion of a coating composition preferably a powder coating composition. The composition may be applied to a desirable substrate which on heating would form a hard adherent film. The powder that is employed in the present case generally is a very fine powder, having a range of particle size, from about 0.1 to about 250 microns, preferably 1 to 150 microns and more preferably from about 10 to 100 microns, preferably having an average diameter of less than 35 microns.

The substrate that the coating is applied on may be unprimed metal, plastic, glass and the like. It is to be appreciated that on non-conductive surfaces, a conductive deposit such as carbon or metal may be placed thereon, prior to applying the coating composition. This is especially true if the powders are to be electrostatically deposited onto a charged substrate. If one did not wish to apply such a conductive layer, it would be possible to heat the substrate so that the particles may adhere thereto. It has been found that desirable top coat qualities can be obtained when a metallic substrate is employed. While the metallic substrate may be cleaned with normal cleaning techniques such as a chlorinated hydrocarbon, alkali and the like, the powder may be applied directly onto the metallic substrate without the use of a normal phosphate corrosion resistant coating compositions. In some instances, however, it has been found desirable to obtain long time corrosion resistance with powder coatings to apply a phosphate corrosion resistant coating composition onto the metallic substrate.

Generically the components of the coating composition is a polymerized resin having isocyanate reactive functionality. In other words, the resin is already polymerised but has pendant functional groups, which groups may react with the isocyanate group from the cross-linking agent. The cross-linking would occur durring the curing (normally by heating) of the powder coating. By "isocyanate reactive functionality" is meant that the composition has a reactive group which may react with an isocyanate group.

Examples of polymerized resins having isocyanate reactive functionality preferably are thermosetting resins although thermoplastic resins may also be employed. A preferred polymerized resin is one containing pendant groups that have replaceable hydrogen atoms such as those hydrogens which are present in a hydroxyl group, an amino group (a primary or secondary amino), a mercapto group, an amido group and the like. While Applicant does not wish to be tied to any theory of the invention, it is believed that the hydrogen atoms will shift from the aforementioned groups to the unblocked isocyanate group during cure or there may be an ester interchange of carbonyl addition reaction whereby the isocyanate group is not reformed but rather an intermediate is formed. The polymerized resin is preferably a linear polymer. The resin may be a polymerized ethylenically unsaturated material, such as acrylics, methacrylics, vinyls, polyesters, and the like. The preferred polymerized resin is one where the monomer is of the formula $[R^1-O-(O)C]-A-[C(O)O-R]_n$, wherein $n'$ and $t$ are 0 or 1 and $n' + t$ is from 1-2; wherein A is alkenyl or alkenylene of from 2 to 8 carbon atoms or a substituent thereof, wherein the substituent may be chloro, carboxy or cyano; it is to be appreciated that A may be branched or straight chain; and R and $R^1$ may be the same or different and may be hydrogen, alkyl of from 1 to 20 carbon atoms, preferably 2 to 8 carbon atoms, hydroxy substituted alkyl of from 1 to 20 carbon atoms, preferably 2 to 8 carbon atoms, and even more preferably 2 to 5 carbon atoms, a primary or secondary amino substituted alkyl of from 1 to 20 carbon atoms, preferably 2 to 8 carbon atoms; wherein the substituent on the amino group is an alkyl group or a hydroxyl alkyl group of from 1 to 6 carbon atoms; mercapto substituted alkyl of from 1 to 20 carbon atoms, preferably 2 to 8 carbon atoms; alkyl thio alkylene of up to 20 carbon atoms, preferably up to 8 carbon atoms, and a group of up to 8 carbon atoms containing an oxirane ring, most preferably 3 carbon atoms as glycidyl.

Of the above monomers, the most preferred are those $n'+t=1$, especially acrylics, methacrylics, and the like.

Of the above monomers, suitable examples of acids are acrylic, methacrylic, itaconic, ethacrylic, maleic, fumaric, and the like; suitable examples of alkyl esters are where the alkyl group is methyl, ethyl, propyl, isopropyl, butyl, tert-butyl, pentyl, hexyl, ethylhexyl, octyl, decyl, dodecyl, and the like; suitable examples of hydroxy substituted alkyl is hydroxyl ethyl, hydroxy propyl, hydroxy butyl, hydroxyl pentyl, hydroxy hexyl, hydroxyl octyl, hydroxy decyl, hydroxyl dodecyl, and the like; suitable examples of aminoalkyl are amino methyl, amino ethyl, amino propyl, amino butyl, amino pentyl, amino hexyl, amino octyl, amino decyl, amino dodecyl wherein the amino group is a primary amino or a secondary amino and the substituent on the amino is an alkyl group of from 1 to 6 carbon atoms, preferably 1 to 4 carbon atoms; suitable examples of a mercapto alkyl are methyl mercapto, ethyl mercapto, propyl mercapto, butyl mercapto, pentyl mercapto, hexyl mercapto, octyl mercapto, decyl mercapto, dodecyl mercapto, and the like; in like manner the alkoxy alkyl and the alkyl thio alkyl groups may be methoxy methyl, ethoxy methyl, ethoxy ethyl, methyl thiomethyl, ethyl thioethyl and the like.

It is to be appreciated that while the polymerized resin may be a homopolymer, it is most desirable to utilize a mixture of monomers to give various properties to the coating composition of the film such as improved chip resistance, chalking resistance, adherence, gloss, flexibility, durability, hardness, flow, caking resistance and solvent resistance.

A preferred polymerizable monomer mixture is one having a major amount of esters (R or $R^1$ in above formula is alkyl or substituted alkyl where the substitutent is non-functional or non-reactive) (about 50 to 90%); a minor amount (up to 5%) of an acid (R or $R^1$ is hydrogen), and a significant amount (about 5 to 50%) of a functionally substituted alkyl (R or $R^1$ is an alkyl group having a substituent which has isocynate reactive functionality).

In addition, other copolymerizable monomers, having an ethylenically unsaturated group, may be added to the mixture in minor amounts (from about 0.1 to 10%) such as aliphatic or aromatic vinyls (e.g. vinyl chloride, vinyl toluene, styrene and the like).

While an acrylamide monomer may also be employed as a portion of the polymer, it is not preferred for automotive top coat quality resins.

All that is required for the polymerized resin is that it have pendant isocyanate reactive functional groups, such as those recited above.

The polymerization reaction of the aforementioned monomers employs standard polymerization technique using catalysts, promoters and the like. A preferred process is solution polymerization in various organic solvents.

Since the composition is to be utilized preferably as a powder coating composition, the temperature for curing should be at as low a temperature as possible. Therefore it is preferred that the molecular weight of the polymerized resin be relatively low, such as, from about 10,000 to about 75,000 with as little deviation from the number average as possible. In other words, to obtain such a cure, the range of molecular weight for a given copolymer should be as narrow as possible, yet still within the above range.

It should be pointed out that the low molecular weight resin is to achieve desirable flow, film appearance, less "orange peel" appearance and the like. A narrow molecular weight distribution permits a high caking temperature for powder, better flow, better gloss appearance and better compatibility with the other components of the powder composition.

The cross linking agent and polymerized resin that is prepared according to the above procedures may be used as a paint base for application onto a suitable substrate after appropriate dilution with an organic solvent. In addition, however, the paint (solvent plus film former i.e. polymerized resin + cross linking agent) may be used in the preparation of powder paint particles according to the process described in U.S. Pat. No. 3,737,401, Method of Making Powder Paint, which is hereby incorporated by reference.

The preferred method of making powder particles of the present invention is to prepare the particles by the precipitation process of U.S. Pat. No. 3,737,401. In that process finely divided droplets are formed of film former plus organic solvent for the film former. When the liquid paint is brought into contact with a second solvent which is a non-solvent for the film former but is mutually solvent (partially miscible) with the first solvent the droplets are formed. The powder particles are precipitated when the first solvent is removed from the droplets by dilution therefrom during contact with a solvent in which the first solvent is miscible. A preferred pair of solvents is an organic solvent (a ketone) for the film former and water. For a further discussion of preparation of powder particles, see Ser. No. 460,109 filed Apr. 11, 1974 and now abandoned, which is hereby incorporated by reference.

Other components may be added to the liquid prior to forming the powder particles, such as, pigments, fillers, organic dyes and lakes, plasticizing and flow control agents, catalysts to accelerate cure rate, antistatic agents and the like. A preferred additional plasticizing agent that may be blended in with the cross linking agents is an ester resulting from the reaction of a saturated aliphatic triol having up to 12 carbon atoms (about 2 parts by weight) with a long chain monobasic fatty acid (having at least 5 carbon atoms — about 2 parts by weight), which reaction product is then reacted with an aromatic or a saturated aliphatic dibasic acid or anhydride (about 1 part) resulting in a composition having excess, preferably 50% excess, of hydroxyl groups. This plasticizing agent's hydroxyl groups may react with the unblocked isocyanate groups of the cross linking agent during cure of the powder.

It should be further appreciated that other soluble plasticizing agents may be added to make up the film forming components in order to react with excess unreacted unblocked isocyanate groups. Therefore these additional agents need only have as a requirement the ability to have isocyanate reactive functionality (having groups which contain replaceable hydrogen atoms, such as those described below) and impart their plasticizing properties to the resin.

Any of the above recited plasticizing agents may be employed. Preferred materials are polyhydric materials such as cellulosics (cellulose acetate, cellulose acetate butyrate), alkane polyols, polyhydric lactones and lactams having rings of 5 to 7 members, polyhydric hydantoin materials and the like.

Based on film forming constituents, totaling 100% by weight, powder or organic solvent compositions of the present invention can be described as follows:

| | | |
|---|---|---|
| polymerized resin | 30 – 75% | |
| cross-linking agent with plasticizing agent reacted therewith | 70 – 25% | |
| Additional plasticizer | 0 – 10% | preferably at least 1% |

The powder or organic solvent compositions can also be described as the ratio of various reactive groups.

| | | | |
|---|---|---|---|
| A. | polymerized resin | 0.7 – 1.5 | isocyanate reactive groups |
| B. | cross-linking agent | 0.8 – 1.5 | isocyanate groups |
| C. | plasticizing agent (prior to reaction with cross-linking agent) | 0.8 – 1.1 | isocyanate reactive groups |

The total of B + C should have excess NCO groups in order to be reactive with the polymerized resin.

Having described the invention above, other embodiments of the invention are described below. All temperatures are in degrees F. and all percentages are percentages by weight unless otherwise indicated.

EXAMPLE 1

Charged into a suitable container having a stirrer were isophorone diisocyanate (75.2 equivalents) and methyl ethyl ketone (2,000 parts) under nitrogen and agitated. Methyl isobutyl ketoxime (37.5 equivalents) were added and the temperature was maintained less than 25° C. The solution was mixed until about 49.86% of charged polyisocyanate was reacted. Then trimethylol propane (18.85 equivalents) and 1,6- hexanediol (18.85 equivalents) were charged as well as methyl ethyl ketone (3825 parts) and a tin catalyst (6 parts). The mixture is then heated for two hours. The free NCO content was tested and additional amounts of trimethylol propane were added until 99% of the charged NCO was reacted.

EXAMPLE 2–5

The procedure of Example 1 was followed except the following alcohols were used in place of the mixture trimethylol propane and 1,6- hexanediol:

| Example | Alcohol | # of Equivalents |
|---|---|---|
| 3 | trimethylol propane | 37.7 |
| | 1,6-hexanediol | 37.7 |
| 4 | 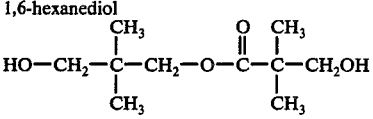 | 37.7 |
| 5 | 1,3-dihydroxy ethyl-5,5-dimethyl hydantion | 37.7 |

EXAMPLE 6

An acrylic resin formulation was prepared by adding to an organic ketone solvent one part of acrylic acid, one part of ethylhexylacrylate, six parts ethylhexylmethacrylate, twenty parts of methyl methacrylate, five parts of hydroxy propyl methacrylate; the solution was polymerized with an azocatalyst at about 80° C.

The cross-linking agent employed was that produced in Example 1. A solution was then prepared comprising the acrylic polymer in its solvent and the cross-linker in its solvent on a 2:1 basis of polymerized acrylic resin to cross-linking agent. Carbon pigments were added at the ratio of 1 part of pigment per 25 parts of acrylic resin and powdered particles were produced in accordance with U.S. Pat. No. 3,737,401 by agitating the film forming solution and then adding it to a mixture of liquid water and the ketone at which point the droplets began to occur. Then the solution is added to substantial additional amounts of water to effect the precipitation of the powder by dilution of the ketone from the droplets. The powder was then separated from the liquid by being filtered, washed and dried.

The particles had diameters ranging between 5 and 50 microns.

A cleaned steel panel was used as the substrate upon which the particles were electrostatically sprayed. The film was cured to a hard, adherent, high gloss finish by baking the panel at about 325° F.

What is claimed is:

1. A process for producing a blocked polyisocyanate comprising the steps:
    1. Reacting isophorone diisocyanate with a blocking agent and interrupting the reaction prior to completion by allowing about 45–50% of the charged isocyanate to react thereby blocking about 90–100% of the more reactive isocyanato group;
    2. Reacting the product of Step 1 with a polyfunctional agent, which agent is an internal plasticizing agent for a polymerized resin having isocyanate reactive functionality after curing of the resin and an external plasticizing agent prior to curing of the resin wherein said polyfunctional agent is a compound containing at least four carbon atoms and the functional groups are hydroxyl groups which are separated from each other by at least one carbon atom; wherein the number of isocyanato groups of the product of Step 1 is in excess of the number of hydroxyl groups present in the plasticizing agent;

3. Determining the free isocyanate content of the product of Step 2; and
4. Then reacting an amount of said polyfunctional agent sufficient to react with the unreacted isocyanato groups.

2. The method of claim 1 wherein the blocking agent is an oxime.

3. The method of claim 2 wherein the oxime is a dialkylketoxime, wherein each alkyl group has from 1 to 6 carbon atoms.

4. The product of the method of claim 1.

5. The process of claim 1 wherein the plasticizing agent is a polyhydric hydantoin or a polyhydric methylene-bis hydantoin.

6. The method of claim 1 wherein the plasticizing agent is a polyhydric alkane having up to 12 carbon atoms in the molecule.

7. A coating composition comprising a hydroxy containing acrylic resin and the product of claim 4.

8. A composition comprising:
A. From 30–75% by weight of an acrylic resin which is the polymerization product of reacting one part by weight of acrylic acid, one part by weight of ethylhexylacrylate, six parts by weight of ethylhexylmethacrylate, twenty parts by weight of methylmethacrylate and five parts by weight hydroxy propyl methacrylate; and
B. From 10–25% by weight of a cross-linking agent which is a blocked polyisocyanate produced comprising the steps:

1. Reacting isophorone diisocyanate with a blocking agent and interrupting the reaction prior to completion by allowing about 45–50% of the charged isocyanate to react thereby blocking about 90–100% of the more reactive isocyanato group;
2. Reacting the product of Step 1 with a polyfunctional agent, which agent is an internal plasticizing agent for the polymerized resin having isocyanate reactive functionality after curing of the resin and an external plasticizing agent prior to curing of the resin wherein said polyfunctional agent is a compound containing at least four carbon atoms and the functional groups are hydroxyl groups which are separated from each other by at least one carbon atom; wherein the number of isocyanato groups of the product of Step 1 is in excess of the number of hydroxyl groups present in the plasticizing agent;
3. Determining the free isocyanate content of the product of Step 2; and
4. Then reacting an amount of said polyfunctional agent sufficient to react with the unreacted isocyanato groups.

* * * * *

UNITED STATES PATENT AND TRADEMARK OFFICE
CERTIFICATE OF CORRECTION

PATENT NO. : 4,089,844
DATED : May 16, 1978
INVENTOR(S) : Ivan H. Tsou

It is certified that error appears in the above-identified patent and that said Letters Patent are hereby corrected as shown below:

In Column 12, line 4, delete "10" and insert ---70---.

Signed and Sealed this

Fourteenth Day of November 1978

[SEAL]

Attest:

RUTH C. MASON
Attesting Officer

DONALD W. BANNER
Commissioner of Patents and Trademarks